United States Patent [19]

Jarrell et al.

[11] Patent Number: 5,294,258

[45] Date of Patent: Mar. 15, 1994

[54] APPARATUS FOR PRODUCING AN INTEGRAL ADHESIVE MATRIX

[75] Inventors: Curt Jarrell, Duluth, Ga.; Manfred Kubo, Embsen, Fed. Rep. of Germany; Hans-Jurgen Meissner, Luneburg, Fed. Rep. of Germany; Gustav Rieckmann, Wittorf, Fed. Rep. of Germany; Jurgen Benecke, Luneburg, Fed. Rep. of Germany

[73] Assignee: Nordson Corporation, Westlake, Ohio

[21] Appl. No.: 865,308

[22] Filed: Apr. 8, 1992

[51] Int. Cl.$^5$ ............................................. B05C 3/20
[52] U.S. Cl. ................................. 118/410; 118/411; 118/419
[58] Field of Search .................... 118/400, 411, 419

[56] References Cited

U.S. PATENT DOCUMENTS

| | | | |
|---|---|---|---|
| 1,391,281 | 9/1921 | Snyder | 118/407 |
| 1,929,877 | 10/1933 | Bonamico | 430/495 |
| 3,113,884 | 12/1963 | Kohler | 427/288 |
| 3,251,727 | 5/1966 | Reynolds | 161/148 |
| 3,502,494 | 3/1970 | Ishiwata et al. | 427/58 |
| 3,595,204 | 7/1971 | McIntyre et al. | 118/8 |
| 3,808,088 | 4/1974 | Knechtges | 161/148 |
| 3,886,898 | 6/1975 | Colegrove et al. | 118/411 |
| 4,143,187 | 3/1979 | Pilgrim et al. | 118/411 |
| 4,671,205 | 6/1987 | Billeter | 118/68 |
| 4,746,545 | 5/1988 | McIntyre | 427/176 |
| 4,774,109 | 9/1988 | Hadzimihalis et al. | 427/286 |
| 4,822,640 | 4/1989 | Tuhkanen et al. | 427/211 |
| 4,874,451 | 10/1989 | Boger et al. | 156/291 |
| 4,906,492 | 6/1990 | Groshens | 427/148 |
| 5,000,112 | 3/1991 | Rothen et al. | 118/411 |

FOREIGN PATENT DOCUMENTS

| | | |
|---|---|---|
| 0080144 | 6/1983 | European Pat. Off. . |
| 0173179 | 3/1986 | European Pat. Off. . |
| 0203280 | 12/1986 | European Pat. Off. . |
| 0329829 | 2/1988 | European Pat. Off. . |
| 0293065 | 11/1988 | European Pat. Off. . |
| 1274864 | 8/1968 | Fed. Rep. of Germany . |
| 2551233 | 5/1976 | Fed. Rep. of Germany . |
| 2115958 | 6/1972 | France . |
| 787798 | 12/1957 | United Kingdom . |
| 1325357 | 8/1973 | United Kingdom . |
| 2247031 | 2/1992 | United Kingdom . |
| 2257038 | 1/1993 | United Kingdom . |

OTHER PUBLICATIONS

Nordson BC-40 Coating Head (2 pages), 1-92.

*Primary Examiner*—Matthew O. Savage
*Attorney, Agent, or Firm*—Wood, Herron & Evans

[57] ABSTRACT

A breathable laminate comprises at least two porous webs laminated together with a porous adhesive matrix, preferably a random fibrous adhesive pattern having a coat weight of between 1.5 and 12 grams per square meter. The two or more porous webs comprise woven or non-woven materials and the resulting breathable fabric or laminate has good hand and flexibility. Breathable fabric is adhered to foam by such random fibrous adhesive patterns of similar coat weights. Coating widths of up to 80 inches or more are produced in a slot die fed by a selected plurality of recessed lands within the die, with motors and pumps controlled to maintain consistent, uniform coat weights regardless of coat widths and substrate speeds selected. Single ply coated webs, apparatus and methods are disclosed.

5 Claims, 8 Drawing Sheets

APPARATUS FOR PRODUCING AN INTEGRAL ADHESIVE MATRIX

This invention relates to the application of adhesives to textiles, to the lamination of textiles and to the production of adhesive coatings for fabrics, textiles and for laminations of same. More particularly, this invention relates to the lamination of porous or breathable textile materials and to other such materials to form a breathable fabric, to the lamination of breathable textiles as a covering on foam, to the application of adhesives to single or multiple ply textiles to enhance appearance or performance and to apparatus and process for producing low coat weight adhesive patterns or matrices for use with such materials and lamination.

In the past, non-breathable composite laminates such as diapers and patient pads have included a fluid impervious layer adhered to an absorbent layer. In one process, such as described in U.S. Pat. No. 5,000,112, a low coat weight adhesive is dispersed from a plurality of separately fed nozzles into a fine slit die mouth for application to the fluid impervious layer up to about 80 cm in width. Nevertheless, the resulting laminate is not breathable.

Moreover, in this device, coating width changes for coating wider or narrower webs require die disassembly and extra die parts, adding downtime and labor expense for changeovers.

It is desirable to produce breathable, multiple-layer flexible fabrics for a variety of applications, yet the known processes for producing flexible breathable laminates all have certain attendant disadvantages.

In one lamination process, a powdered adhesive is placed between textile layers. This composite is then run through an infrared oven where heat is applied to melt the adhesive and fuse the layers together. In this process, finely ground, powdered, hot melt adhesive is dispersed on a gravure or engraved roll which transfers the powder to a first textile web. A second web is laid on the first web and the composite structure run through an oven to melt the hot melt adhesive.

Such a process requires a large floor space and a large amount of energy for the oven. Moreover, web speeds are limited to a range of about 80 feet to 120 feet per minute. Also, some adhesive patterns and coating weights can only be changed by changing the powder roll. The hot melt adhesives used in these processes typically cost up to 30% more than other hot melts due to the additional manufacturing process of cryogenically cracking and reducing the hot melt to a fine powder form.

Moreover, with thin webs, the powder tends to strike through, resulting in an undesirable look and feel. Further, powder can fall into open cells, such as in foam substrates, reducing breathability, increasing stiffness and increasing material cost.

A second prior method utilizing hot melt adhesives for fabric lamination incorporates the spraying of hot melt adhesive fibers onto a textile surface by means of a meltblown process or some other fiber process such as the process known as the Nordson Controlled Fiberization process (a swirling operation), the equipment for which is available from The Nordson Corporation of Westlake, Ohio. Meltblown or fiber spray processes may not provide accurate edge control. The swirl operation generally leaves heavier amounts of adhesive at the side edges of the swirl, with lighter applications at the center, producing a non-uniform adhesive coverage. In both meltblown and fibrous processes, the use of air to disperse the adhesive results in the adhesive being cooled as it travels to the web. This cooling reduces its ability to wet or penetrate the surface of the web, thus reducing its bonding capability.

In yet another method of laminating textiles, a plurality of fine parallel beads or lines of adhesive are applied to a moving web to be laminated to another web. Such a process provides accurate coating and permits a higher operational speed. The result of this process is a laminated fabric in which the adhesive points are distinct longitudinal lines with free spaces in between. When the fabric is cut, there are loose edges along the cuts between the adhesive lines and there is a directional stiffness or rigidity in the product. Moreover, the individual beads tend to "show through" the fabric, with the beads being pronounced, visually apparent and apparent to touch.

Where solvent-based adhesives are used, one disadvantage resides in the discharge of volatile materials and fumes. This is unacceptable in today's environment.

While it is highly desirable to produce a breathable fabric of laminated textiles, these foregoing processes do so only with the attendant disadvantages noted.

Accordingly, it has been one objective of the invention to provide improved breathable fabrics of laminated textiles. These fabrics are uniform, fully adhered, with resistance to high temperatures, such as incurred in ironing, and with soft, round hand and good drape, i.e. good feel and flexibility in all directions.

It has been a further objective of the invention to provide an improved process for manufacturing a breathable fabric laminate of porous textiles with reduced process equipment space and increased line speeds with greater uniformity than prior processes.

It has also been an objective of the invention to provide an improved apparatus and process for production of an improved, breathable, laminated fabric and accommodate varied adhesive coating weights and pattern widths.

A still further objective of the invention has been to provide improved methods for producing improved breathable, laminated industrial fabrics using high viscosity hot melt adhesives.

In another aspect of the invention, it is desirable to adhere a laminated fabric or textile to a foam base or cushion. Such structures are used, for example in automotive applications such as seats, headliners and upholstery panels.

Presently, such adhering steps are carried out in a process known as flame laminating. In such a process, a polyurethane foam cushion, for example, is heated by a flame process to soften the polyurethane to the extent that the fabric applied thereto will adhere. Such process has several drawbacks including the cost of the foam lost as a result of the heating process. This can amount to a loss of about twelve cents per square yard. Moreover, the speed of lamination is limited practically to about 70 or 80 feet per minute. Still further, such processes can give off formaldehydes and isocyanates, both of which are undesirable emissions, and in some locations, prohibited by law. Flame lamination requires special foams and is difficult to control. This results in non-uniform bonds, and glazing of the surface. Such glazing reduces breathability and other desirable characteristics.

Accordingly, it has been a further objective of the invention to provide an improved process for adhering breathable fabric to foam structures.

A further objective of the invention has been to provide an improved process for adhering breathable fabric to foams without foam loss and at reduced overall cost.

In still another aspect of the invention, it is desirable to provide a single or multiple ply textile with a non-slip or non-skid surface without losing hand or breathability. For example, such anti-skid textiles may be used as placemats on tables, doormats or the like. For such use, it is desirable to provide the textile with only so much adhesive material to provide, when cured, an anti-skid property, without detracting from its hand, flexibility, breathability or appearance.

Accordingly, another objective of the invention is to provide fabrics with a non-slip surface, without loss of hand, flexibility, breathability or appearance.

In yet another aspect of the invention, certain fabrics, such as woven mattress covers, include warp or machine direction threads made of polyester filaments. The weft or pick threads, in the cross machine direction, may be made of polypropylene. In fabrics having a weft to warp ratio substantially greater than one, the threads may move or slide. Further, in producing selected patterns of shiny and dull contrasts, more of one thread may be prominent on one side of the fabric than another. Since there are varying densities of one type thread on one side or the other of the fabric threads, the cords again can tend to slip.

A still further objective of the invention is been to provide a process for locking fibers or threads of a fabric in place without loss of hand, flexibility, breathability or appearance.

To these ends, a preferred embodiment of the invention comprises a breathable laminated fabric having two layers of porous non-woven textile materials and intermediate, fluid pervious hot melt adhesive, disposed between contact areas of said textile layers, and comprising a fine, fibrous random adhesive matrix. This fully adhered binding is accomplished by a random matrix which produces a large number of small bonding sites.

A slot die is used to dispense viscous hot melt adhesive in a fibrous or porous adhesive matrix by means of metering pumps feeding independently and separately controlled die slot supplying lands with hot melt adhesive only in an amount sufficient to produce a fibrous web or other porous adhesive pattern or matrix (as compared to a thin impervious adhesive film). This adhesive pattern or matrix is contact coated onto a first textile web uniformly coating a contact area thereof. Thereafter, the coated textile web may be used as is (where anti-skid or fabric thread locking features are desired), but also can be laminated to a second porous textile web via a heated laminating roll. This matrix deposition and laminating process produces a breathable, multiple layer composite which is fully adhered, resistant to high temperatures such as incurred in ironing processes, and has good flexibility and good hand.

The adhesive is applied in very light coating weights, such as in the approximate range of about 0.075 to about 28 grams per square meter. Coating weights are easily changed by changing pump delivery rates versus line speed. For most breathable composites, 1.5 to 12 grams per square meter is preferred.

Moreover, line speeds up to at least 300 feet per minute can be attained with reduced amount of equipment and good flexibility in changing both coat weight and pattern width.

By using multiple, separately controlled adhesive lines flowing into the lands of segments feeding the fine slot die, and by controlling respective pump speeds when the outer lands or segments are shut down, light weight, uniform adhesive patterns per unit area coated are produced over a wide range of coating widths from 1 inch to 100 inches or more, without altering the basic die structure.

The invention can also be used in the adhesive lamination of porous textiles to foam surfaces. A similar adhesive pattern or matrix as noted above is coated onto the textile, which is then adhered to the surface. Also, multiple porous webs are joined in multiple coating head systems to produce breathable flexible fabrics of three or more porous textile webs. The breathable, flexible laminated products so produced are used in a variety of applications such as automotive fabrics and coverings, filters and the like.

These and other objectives and advantages will become readily apparent from the following detailed description of a preferred embodiment of the invention and from the drawings in which.

For descriptive purposes and clarity throughout this application, the same numbers are sometimes used to identify the same parts as well as identical parts which are used in alternative or modified configurations. Also, where it aids descriptions, suffix letters are used to identify identical parts or elements used in multiple locations.

As further described, the invention contemplates the application of an adhesive matrix to a textile, for various applications, so as not to detract from the hand, flexibility, breathability or appearance of the textile.

The term "textile" is used broadly to include both woven and non-woven breathable materials. When the textiles are woven, they may include warp and weft threads, which may be juxtaposed to provide a design (not shown in FIG. 1).

The term "adhesive" is used broadly herein to include thermoplastic adhesives, thermoplastic resins, reactive adhesives such as polyurethanes (PUR), high performance adhesives and adhesives having a softening or melting point above 180 degrees C. One adhesive used is preferably a high temperature, hot melt adhesive such as, for example, an adhesive available from the H. B. Fuller Company known as H. B. Fuller No. 0904 polyamide adhesive. Of course, any suitable adhesive could be utilized. However, the invention is particularly useful with materials commonly referred to as high performance hot melt adhesives which produce excellent bonding yet, when used according to the invention herein, produce a flexible, breathable fabric of round hand and flexibility. Such adhesive resides on the web 10 (FIG. 1) in a coating weight of approximately 1.5 to 12 grams per square meter of adhesive contact area on the web (see matrix 11 of FIG. 1), and is considered to be a very low add-on weight of adhesive. In addition, coating weights of up to about 28 grams per square meter can be produced in the apparatus disclosed herein, while still maintaining a porous nature. As used herein, the term "matrix" refers to a dispersion of adhesive on the fabric or textile. It can be in a random, fibrous pattern or form, or may take some other form or appearance, remaining permeable with respect to the overall adhesive application. For example, a dot matrix or geometric pattern having porosity may be used.

Figure 1:
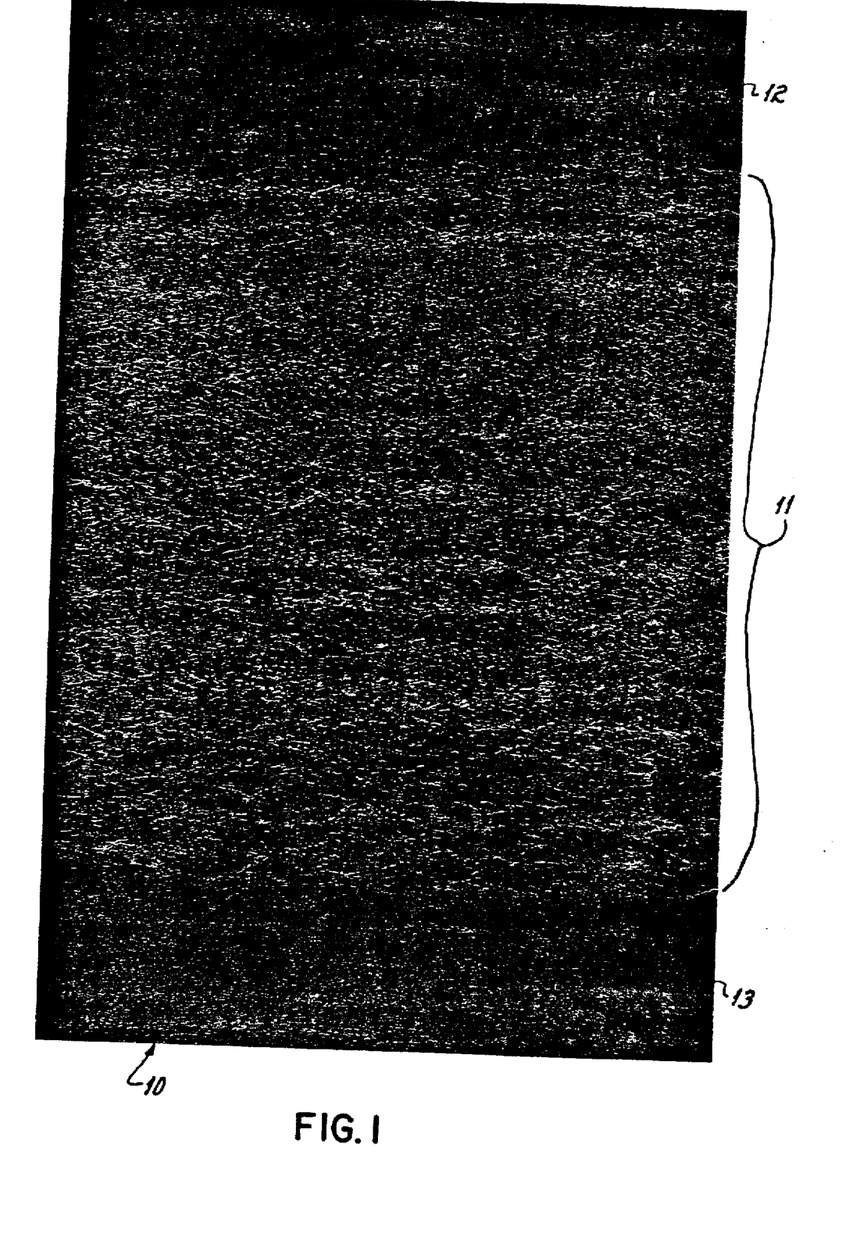
FIG. 1 is a photographic reproduction, in plan view, of a first porous textile web coated in the longitudinal center or contact area with a porous adhesive pattern according to the invention.
Figure 2:
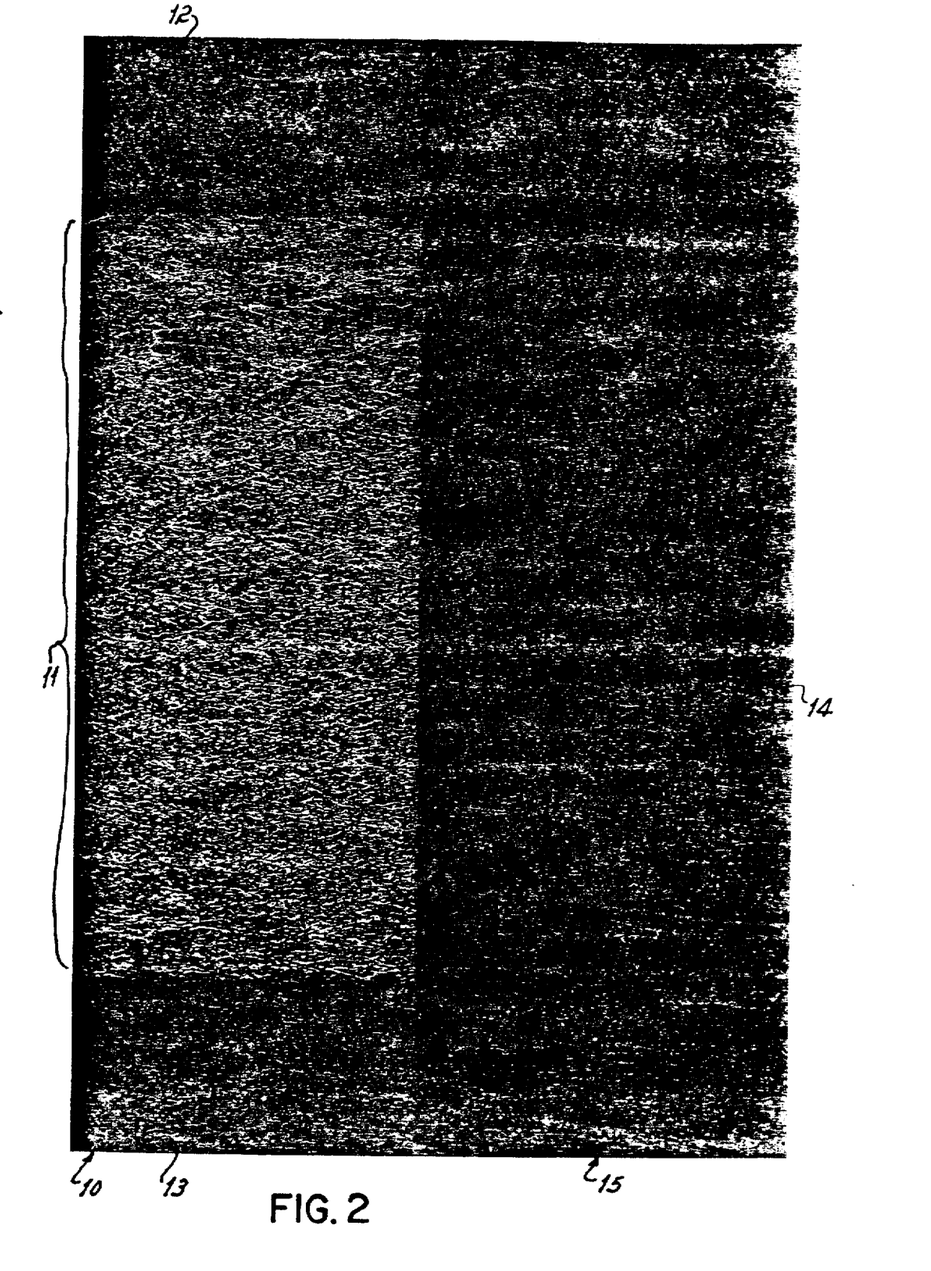
FIG. 2 is a photographic reproduction, in plan view, of a coated porous textile web as in FIG. 1 but also illustrating a second porous textile web adhered over the right-hand portion of the first web by the adhesive pattern on the first porous textile web.

Turning now to the drawings, FIGS. 1 and 2 represent photographs of breathable textile or fabric webs, which include a porous, adhesive pattern or matrix thereon for securing two such webs together. Alternatively, the exposed adhesive matrix, when cured, serves to provide a non-skid surface or fiber-locking function to the web on which it is deposited.

As shown in FIG. 1, the porous textile web 10 is provided with a porous or fibrous adhesive pattern or matrix 11 between the parallel marginal areas 12 and 13 of the porous web 10. The lighter area running from left to right across the middle of the web 10, as designated by the bracket 11, constitutes the fibrous adhesive pattern or matrix lying on the web 10 and is applied, as will be appreciated, as the web is moved in a longitudinal direction, left or right, as viewed in FIG. 1.

FIG. 2 depicts the web of FIG. 1 on the left. However, in FIG. 2 a second porous, textile web 14 has been overlayed on underlying web 10 and the adhesive or matrix 11 to produce a laminated, breathable fabric 15. In FIG. 2, the vertical break in the middle of the photograph represents the left-hand end of the upper porous web 14.

Figure 2A:
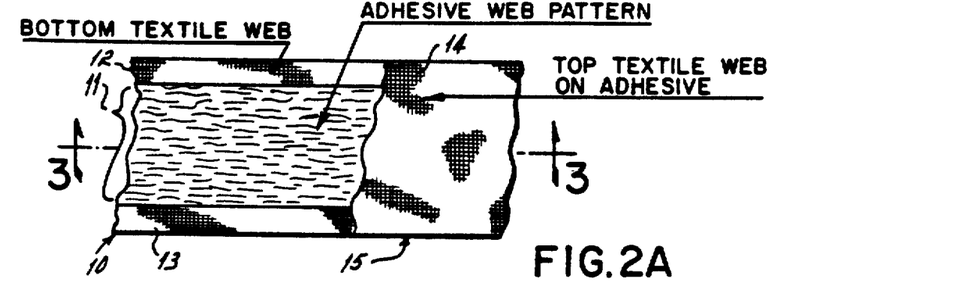
FIG. 2A is a diagrammatic drawing representing the features of FIG. 2.
Figure 3:
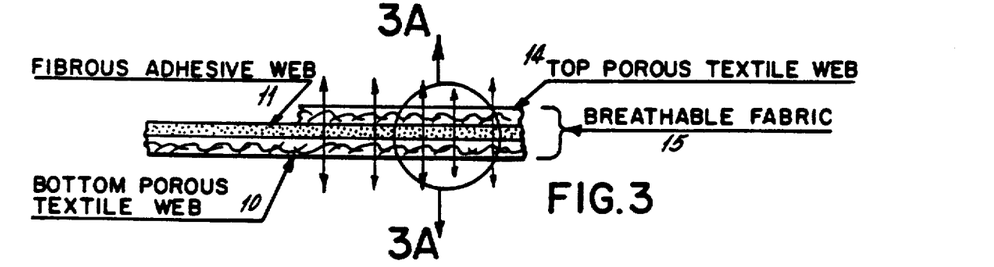
FIG. 3 is a diagrammatic cross-sectional view of the composite breathable fabric of FIGS. 2 and 2A, showing a portion of the top textile broken away, and is taken along lines 3—3 of FIG. 2A.
Figure 3A:
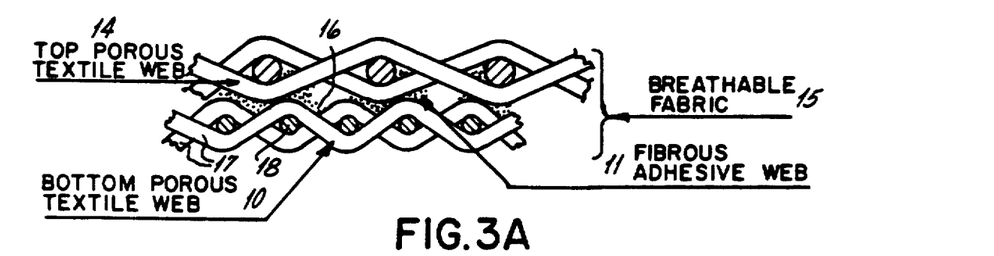
FIG. 3A is a diagrammatic, more detailed view of the encircled section 3A of FIG. 3.

These features are perhaps best seen with reference to FIGS. 2A and 3. FIGS. 2A and 3 are line drawings representing the webs and adhesive photographed in FIG. 2. As represented by the fluid flow arrows shown in FIG. 3, the two webs 10 and 14 are joined by the porous adhesive 11 to form the breathable, flexible fabric 15. The adhesive matrix 11 resides in part in interstices 16 formed in the breathable textiles. In FIG. 3A, textile 10, shown diagrammatically, is either woven or non-woven. When woven, it includes warp threads 17 and weft threads 18, forming interstices 16.

It will be appreciated that while the textile webs and the finished breathable fabric 15 could be very narrow, the coated area represented by the bracket 11 in FIG. 2A, for example, can be much wider, up to a range of 72 or 80 inches or even more for a particular application, the entire adhesive coat being uniform throughout in terms of coating weight and porosity, and being applied from a single, fine slot die, as will be disclosed.

It will also be appreciated that the porous webs 10 and 14 may be of any suitable type, depending on the ultimate use or application desired. One such material, for example, can be the material known as "Reemay" polyester, a non-woven porous textile fabric. Another such material could be a material known as "Hollitex", generally comprising a calendared Reemay material produced by a process of pressure and heat, as is well known. The Reemay material mentioned above is a product of Reemay, Inc. of Old Hickory, Tenn. The Hollitex material referred to above is a product of the Ahlstrom Filtration, Inc. of Chattanooga, Tenn. Another such material could be fiberglass filter media, for example, either in wet lay, non-woven form, or in thermally bonded form. The textile webs 10 and 14 might also comprise woven materials and materials known as "scrims", such as a woven or net-like material having very large openings, like that used in fruit or vegetable sacks.

Figure 5:
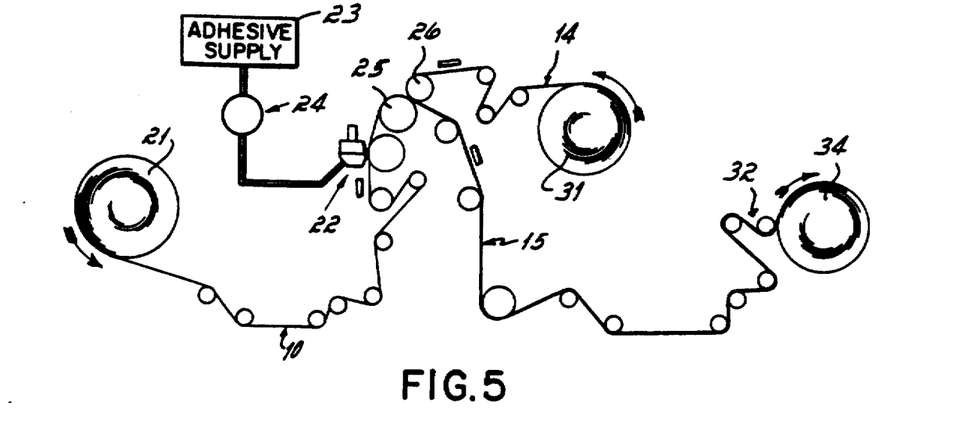
FIG. 5 is a schematic elevational view of apparatus for laminating porous textile webs to form a breathable, laminated fabric according to the invention.

FIG. 5 diagrammatically illustrates one system for manufacture of a breathable fabric 15. A porous, textile web 10 is unwound from a web roll 21 and is directed through a series of rollers to a coating head 22, where a porous adhesive coating such as adhesive matrix 11, is applied to one side of the web 10. Coating head 22 is operably connected to receive hot melt adhesive from an adhesive supply 23 via a motor and pump means in a metering station 24. Thereafter, the web 10 is wound about a laminating roll 25. A web 14 is unwound from a web roll 31 and wound about a series of rollers to a second laminating roll 26, where the two webs 10, 14 are joined together with the adhesive matrix which has been applied to web 10 situated between the two webs. Thereafter, the joined webs travel in the form of the laminated fabric 15 through a series of rollers to a lay-on roller station 32. Thereafter, the breathable, laminated fabric 15 is wound up on a roll 34, for example, from which it can be converted to the desired application or product. FIGS. 2, 2A, 3 and 3A illustrate laminated fabric 15.

It is desirable to control both web tension and die position with respect to the web as is well known in various coating and laminating processes. To prevent voids in the coating, or web wrinkling in tension-sensitive webs, proper tension may be accomplished by the balanced combination of roll placement, driven rolls and electronic, closed-loop tension control. Such techniques are well-known in the web handling art and do not constitute part of the instant invention.

To ensure consistent resin transfer onto the web, typical multi-axis bracketry is used to allow the die to move in and out (with respect to the web) and to pivot up and down. These procedures are also well known in the coating industry.

Figure 4:
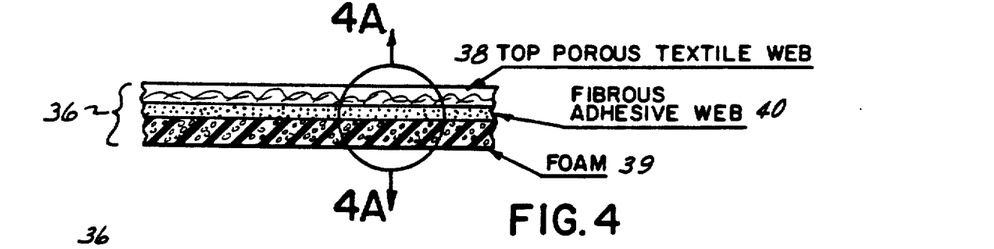
FIG. 4 is a diagrammatic view in cross-section of a breathable textile web adhered to a foam surface by a fibrous adhesive pattern according to the invention.
Figure 4A:
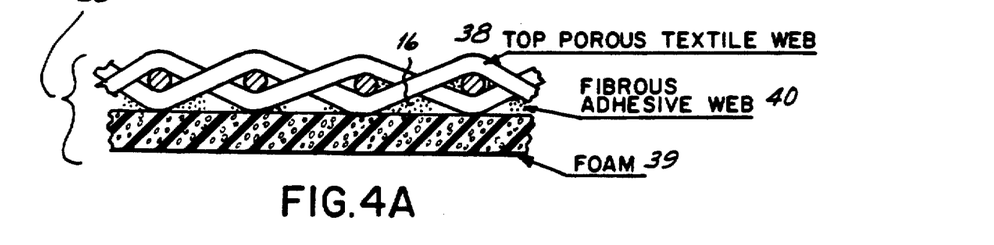
FIG. 4A is a diagrammatic, more detailed view of the encircled section of 4A of FIG. 4.
Figure 7:
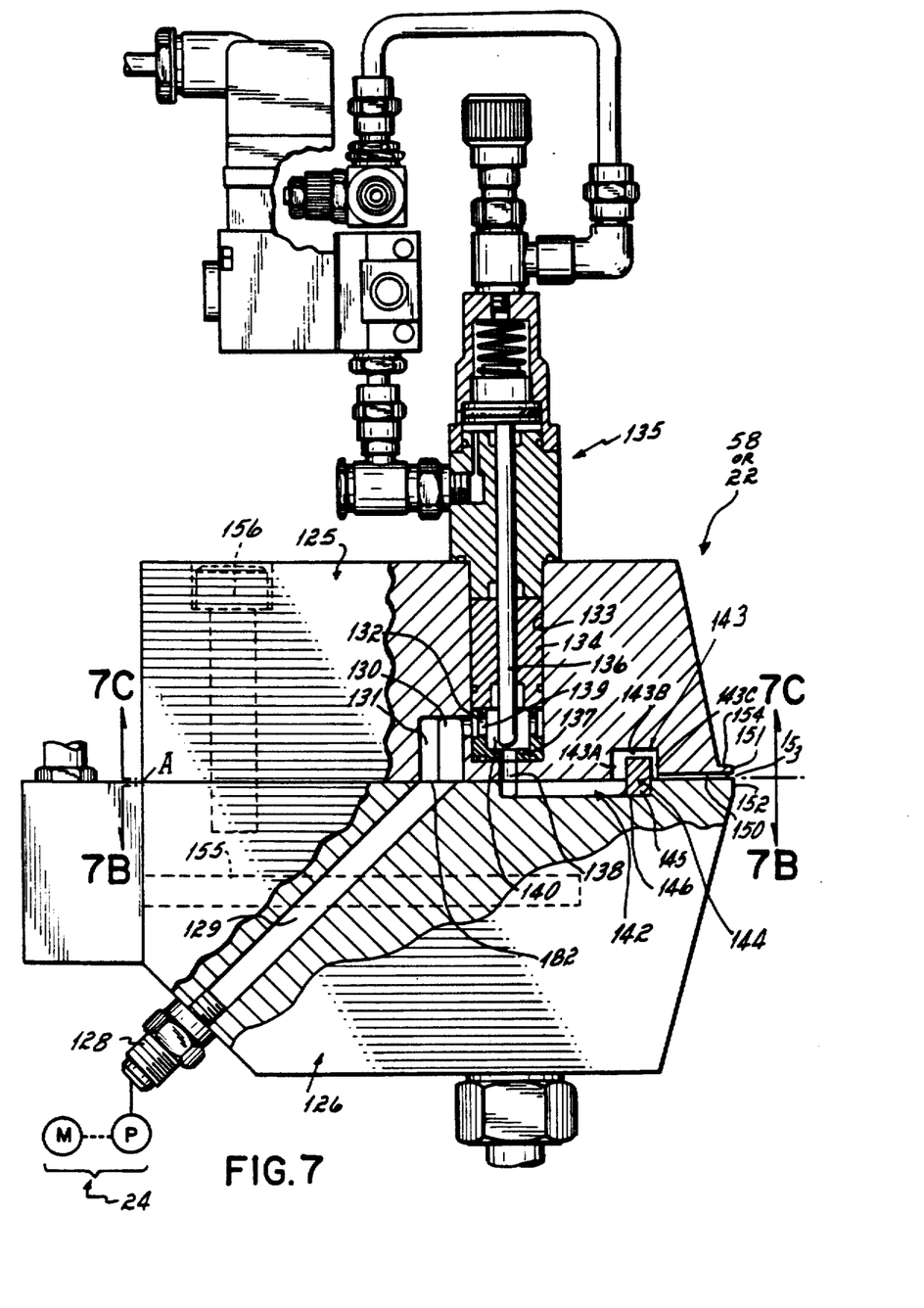
FIG. 7 is a cross-sectional view of a representative fine slot die for producing adhesive patterns according to the invention.

Although some coating processes are concerned with fiber buildup on the die, in this instant process, fibers tend to migrate up the lip 151 of the die 125 (FIG. 7) and collect on the shelf 154 (FIG. 7). Periodic wiping of the die during roll changes and scheduled in-line web cleaning will keep this shelf clean. FIGS. 4 and 4A illustrate a laminated foam and textile composite 36, according to the invention, including an upper layer or web 38 of a porous textile fabric, a layer of foam 39, such as open cell foam, and an intermediate adhesive matrix 40, like matrix 11 and constituting, for example, a random fibrous adhesive pattern or web, as shown. The textile web 38 may be any suitable form of breathable or porous textile fabric, such as that discussed above or such as any other woven or non-woven fabric. The foam layer 39 may comprise, for example, open cell foam, such as that used in padded panels or in cushions for seating purposes or the like. The fibrous adhesive web or matrix 40 preferably constitutes a web of random fibrous pattern of hot melt adhesive, such as that described above, and produced in the same manner as described above and elsewhere herein. The foam 39 may also constitute a web and may be assembled, for example, in an apparatus such as that diagrammatically illustrated in FIG. 5. For illustration, the textile web 38 is substituted for the web 10 of FIG. 5 and the foam web 39 is substituted for the web 14 of FIG. 5, all to form a combined or laminated foam and textile breathable composite 36, which takes the place of the combined web 15 of FIG. 5, for example.

It will be appreciated that the breathable, laminate products discussed above, such as the breathable laminate 15 or the breathable laminate 36, can be manufactured in relatively narrow web forms by means of an accurate flow control process utilized to apply a porous adhesive mechanism between the textile webs or textile and foam webs, so that each layer or component of the laminate is porous, breathable and so that the finished laminate has a round "hand" or feel, where that is a consideration, and good flexibility. The webs and laminates, however, are more preferably produced by the apparatus as further described herein, and as illustrated in FIGS. 5 through 8 herein.

Figure 6:
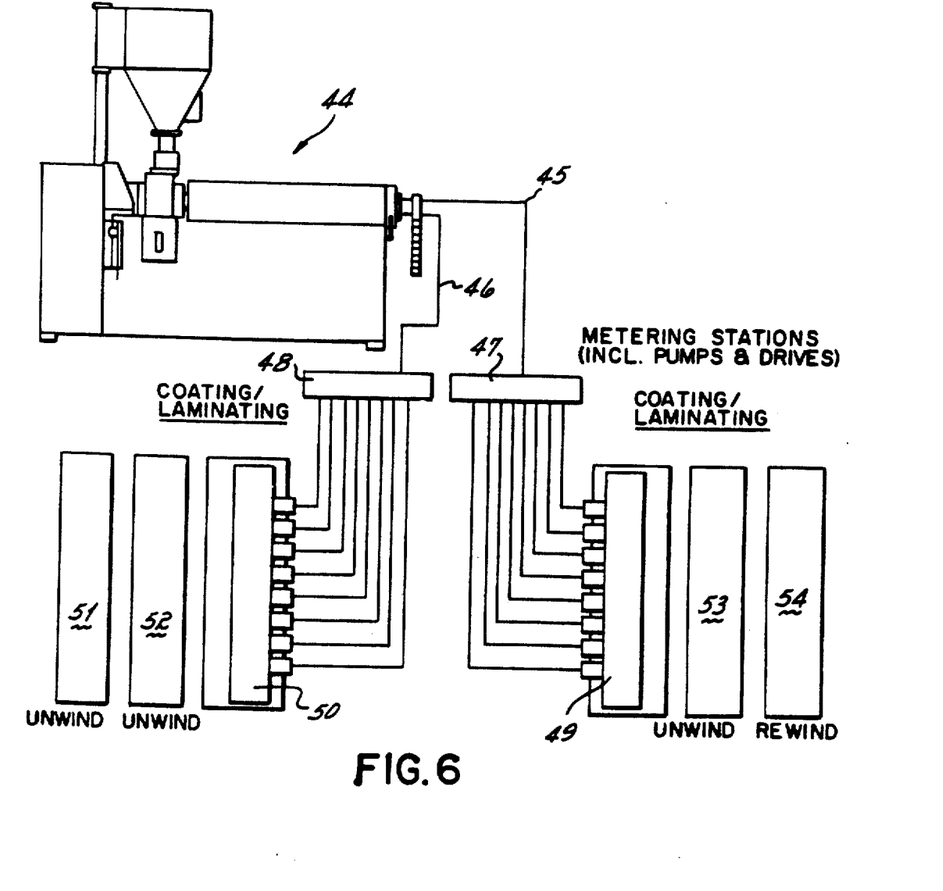
FIG. 6 is a schematic plan view of one form of apparatus using multiple head coating heads for laminating three porous textile webs according to the invention.

Reference is first made to FIG. 6 depicting an extruder 44 for hot melt adhesive, supplying through appropriate hoses or lines 45 and 46 respectively, to multiple metering stations 47 and 48. Metering stations 47 and 48 are respectively connected to multiple coating heads 49 and 50, as will be described. Comparing FIG. 6 to FIG. 5 then, FIG. 5 is an elevational view of apparatus for laminating two porous textiles, while FIG. 6 illustrates a schematic plan view for laminating three porous webs together. It will be appreciated that the adhesive supply 23 of FIG. 5 is analogous to the extruder 44 of FIG. 6. Motor and pump supply means 24 is analogous to the metering stations 47 and 48 of FIG. 6. The coating head 22 of FIG. 5 is analogous to a coating head, such as coating head 49 or 50 of FIG. 6. In FIG. 6, of course, there are simply two metering stations and coating heads which are used, for example, in tandem, in the coating of a plurality of webs to form a multiple component, breathable laminate of three or more porous webs as will be described, with a porous glue pattern between each web.

In FIG. 6, for example, a first web is introduced from a web roll 51 to a coating head 50, where an adhesive such as adhesive is applied. Web 51 is thereafter combined with a second porous web introduced from an unwind roll 52. This two-web laminate is then carried by means of appropriate rollers toward a coating head 49 by means of which an adhesive such as adhesive matrix 11 is applied to a web unwinding from a roll 53. Thereafter, the combined webs 51 and 52 are laminated to the web from roll 53 and the three web component is wound up on a roll 54 to thus produce a three ply, breathable, laminated fabric wherein each of the webs is held to its adjacent web by means of a porous adhesive pattern, such as adhesive 11. Any appropriate web handling apparatus could be used to produce such a laminate, and generally will include the adhesive metering stations and a coating head, such as a coating head 22, as illustrated in FIG. 5 and the details of which are described in FIGS. 7 through 7C.

Figure 8:
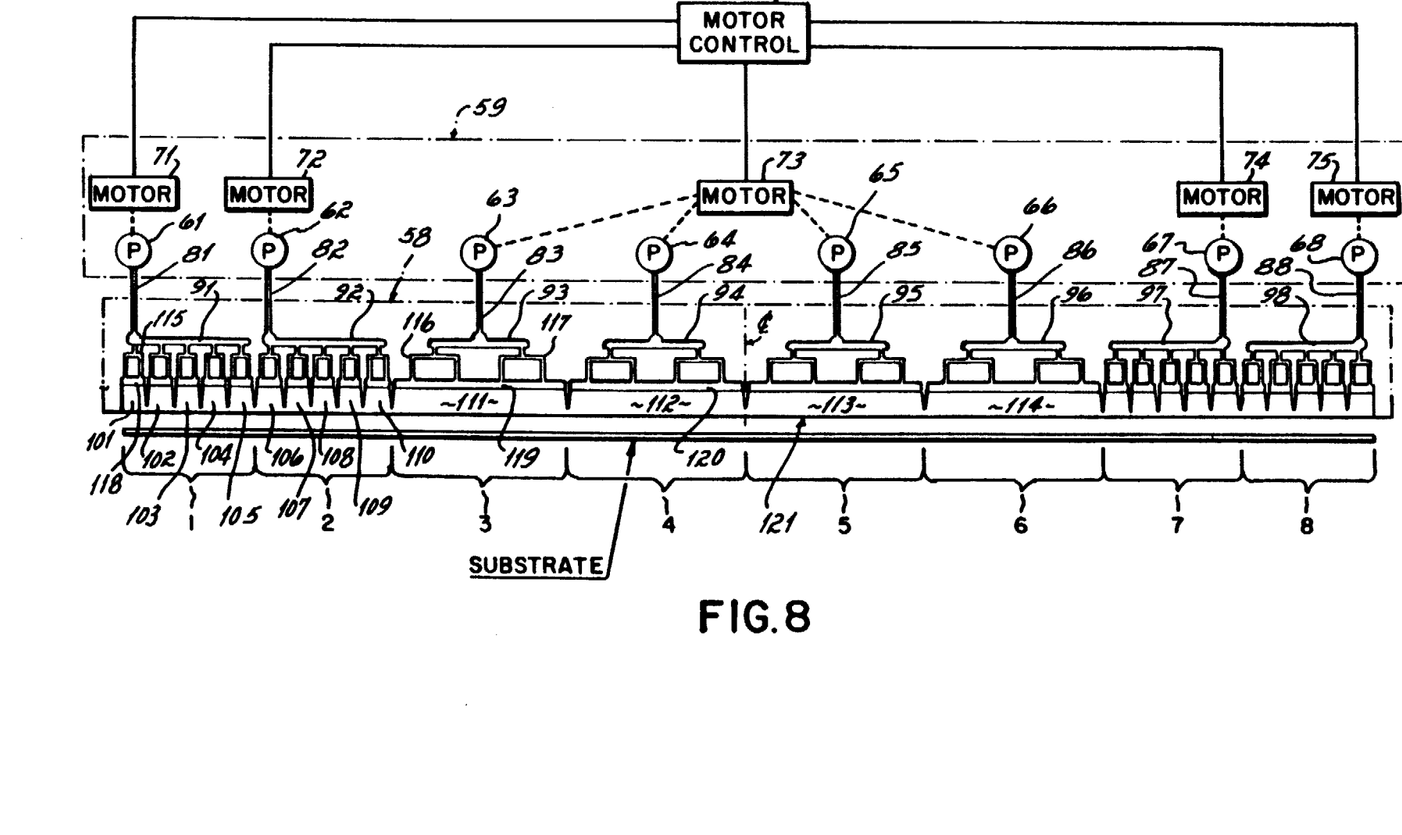
FIG. 8 is a diagrammatic elevational view illustrating internal features of one form of a fine slot die, and pumps and motors associated with a metering apparatus therefor, used in generating a fibrous adhesive pattern for breathable laminates according to the invention.

Turning now to FIG. 8, a representative metering station 59 is operatively connected with a respective, representative coating head 58. Metering station 59 comprises a plurality of motors and adhesive pumps, as will be described.

It will be appreciated that each of the coating head comprises a single, fine slot die for extruding or producing a porous adhesive pattern or matrix, such as a random fibrous pattern as described above, across a desired coating width. As will be described, the fine slot die is represented in a plurality of segments, such as eight segments 1–8. Each segment is fed with adhesive by a single pump such as pumps 61 through 68, as shown in FIG. 8. The die outlet itself, however, is uniform through its elongation across coating head 58. FIG. 8 illustrates a metering station 59 using eight pumps feeding the eight segments of the coating head 58. As will be appreciated, any number and form of segments as described herein can be selected, depending on the adhesive coating width to be produced. The effective width of any segment, however, is preferably no more than 8 to 10 inches to effectively produce the uniform low coat weight porous adhesive used herein.

The metering station 59 includes the pumps 6 through 68 and the motors 71 through 75 as shown. Motors 71 and 72 drive respectively the pumps 61 and 62. At the other end, motors 74 and 75 are operably connected to drive pumps 67 and 68 respectively. In the middle, a single motor 73 is connected to drive all pumps 63, 64, 65 and 66. A motor control 76 is connected to motors 71 through 75 as will be described.

It will be appreciated that each of the segments, one through eight, is independent of the other and can be selectively controlled to produce varying widths of adhesive coating patterns from coating head 58. For example, segments 3, 4, 5 and 6 can be operated while segments 1, 2, 7 and 8 are shut down to deposit a coating width which is equivalent to the sum of the widths of segments 3 through 6. A wider coating width could be obtained by activating segments 2 and/or 7, while a still wider coating width could be obtained by activating additional segments 1 and/or 8. In addition, it is contemplated that any of the segments could be operated independently, where a narrow width of adhesive coating is required on a particular area of the substrate illustrated in FIG. 8. It will be appreciated that the metering station 59, including the pumps and motor drives, are interconnected by means of eight appropriate hoses 81 through 88, to the respective segments 1 through 8 of the coating head or die 58.

Briefly returning to FIG. 6, it will be appreciated that the eight lines on FIG. 6, extending between each metering station 47, 48 to coating heads 49, 50, respectively, are being akin to the hoses 81 through 88, for example, in FIG. 8. Again, FIG. 8 is only diagrammatic and any number of segments as desired can be utilized.

Returning to FIG. 8, it will be appreciated that representative internal portions of the coating head are diagrammatically shown and are not outwardly visible. Some of these features reside internally in a first die half and some in a second, adjacent die half. FIG. 8 illustrates how these features cooperate. Each of the segments is provided with a glue supply slot 91 through 98 respectively, which are fed by the eight hoses 81-88. It will also be appreciated that each of the segments is defined by one or more recessed die lands or "nozzles". For example, in segment 1, there are 5 lands, 101 through 105. In segment 2, there are 5 lands, 106 through 110. In segments 3 through 6, there is only one land, through 114, respectively. Finally, segments 7 and 8 each have 5 independent lands, as shown. Each independent land areas, such as 101 through 111 in segments 1, 2 and 3, are fed by one or more "C"-shaped glue or adhesive distribution channels, as shown in FIG. 8. The independent lands 101 through 110 of segments 1 and 2 are each fed by a separate "C"-shaped or "U"-shaped glue distribution channel, such as the glue distribution channel 115, shown in connection with land 101 of segment 1. The same is true for each of the lands associated with segments 7 and 8. In segments 3, 4, 5 and 6, each of the single, independent lands 111 through 114, respectively, are fed by two "C"-shaped glue distribution channels, such as at 116 and 117 in segment 3.

Each of the "C"-shaped distribution channels feeds into a distributor bar channel, one of which is associated with each of the independent lands of each segment. See, for example, distributor bar channel 118, associated with land 101, and the respective distributor bar channels 119 and 120, associated with the lands and 112 of the respective segments 3 and 4. Each of the distributor bar channels is isolated from adjacent distributor bar channels.

Moreover, as shown in FIG. 8, it will be appreciated that each of the nozzles or lands has tapering side edges which terminate short of a die lip, such as die lip 121, which extends across the entire face of the coating head or die 58 and defines one side of the die slot or outlet, through which adhesive emanates. Adhesive emanating through all of the respective lands in each of the segments, intermingles or knits with adhesive from the next adjacent land just before reaching lip 121 so that a uniform, continuous porous adhesive pattern is laid down on the substrate across the coating width without interruptions or discontinuities in the adhesive corresponding to the various lands. In FIG. 8, for clarity, the fabric substrate is shown spaced from lip 121, while actually the die lip will contact the fabric.

Accordingly, the coating head or die 58 includes an elongated die outlet, as will be further described, which is fed by a plurality of lands or nozzles from the respective segments which are selectively operated. Where a full width coating is desired, all the lands shown in FIG. 8 may be used to provide a continuous porous adhesive pattern. Where a narrower coating width is desired, selected segments are operated, and only the lands associated with that segment are filled with flowing adhesive. Also, as noted below, various lands within the multiple-land segments are independently controlled to provide greater coating width variations.

It will be appreciated that at the coating weights desired, which are relatively light, the adhesive coatings are porous and comprise, as noted above, for example, a random fibrous pattern or matrix. In order to produce such matrix across an entire selected coating width, adhesive is supplied to the various segments uniformly and is extruded therethrough uniformly in comparison with the adjacent segments.

An adhesive valve is provided between the glue slots and each respective "C"-shaped distribution channels, such as 115, 116, 117, for example. These valves permit the tight, selective shutting off of selected die sections to change coating widths. Each separate land or nozzle then, is separately valved and adhesive flow past each can be selectively initiated or stopped.

Moreover, the motors can be selectively run, by means of any suitable motor control 76. Accordingly, for a full width coating, all motors and pumps are run, to flow adhesive through all the lands shown in FIG. 8. When a lesser width coating is desired, for example, only the motor 73 may be run to drive the pumps 63 through 66, so that a coating corresponding to the sum of the widths of the segments 3 through 6 is produced. When other width coatings are desired, such as would be intermediate the full distance covered by the segments 1, 2 or 7, 8, it is possible to shut off some of the lands associated with each of those segments by interrupting the flow from the respective glue supply slots 91, 92, 97, 98, into the associated "C"-shaped channels. This is done by utilization of two adhesive valves 135 (FIG. 7) to interrupt the adhesive flow, for example, into lands 101 and 102, while flow into the lands 103 through 105 is continued. This would accordingly produce a coating width as wide as the sum of the segments 2 through 7 and over three-fifths of each of the segments 1 and 8. It will be appreciated that adhesive can move through the glue supply slot 91, to the lands 103 through 105, irrespective of the fact that lands 101 and 102, for example, have been shut off, as well as the outermost 2 lands in segment 8. This ensures that the slots 91, 92 or 97, 98 will not contain dead end or stagnant adhesive. The width of the coated adhesive is thus selectively controlled by means of valves 13 controlling adhesive flow to each "C"-shaped distribution channel, without requiring any change in the die structure or coating head 58 itself.

It will be appreciated that as the outer nozzles or lands are shut off from glue flow, the motor is still driving the respective pump to supply the same amount of adhesive to the fewer remaining operative lands. Under ordinary circumstances, this would produce more glue for distribution through the remaining lands, increasing coating weight. To obtain consistent and uniform coating weights, however, the motors are selectively controlled by any suitable electrical means associated with a width selecting control, for example, to proportionally slow the motor speed, so that the same proportional flow of adhesive is provided to each remaining land of the segments, as when all those nozzles are operative. Uniformity of coatings is thus provided. Of course, the speed of motor 73 could also be reduced if adhesive flow to lands 111, 112, 113 or 114 were discontinued for narrow width coating.

In other words, the metering pumps in station 59 are controlled to produce a suitable adhesive flow to provide consistent uniform coating weights for the coating width selected. For example, selective slot die sections are opened to produce coating or closed to cut off coating by means of the on-off valves 135 leading to each "C"-shaped distribution channel (FIG. 7) 171–181 (FIG. 7B), for example. If, for example, two out of five sections of a segment are closed, the speed of the associated metering gear pump feeding that segment is reduced by 40%.

It will also be appreciated that only one or more of segments 3–6 (FIG. 8) could be used for a narrow width coating in this instance, motor 73 could be slowed by 25% for each segment shut down to ensure appropriate adhesive flow to provide the appropriate basis weight coating as desired through the lands or segments remaining operable.

Also, it will be appreciated that the flow rate from the metering gear pump can be controlled in a closed loop feedback control system, of any suitable type, to maintain the exact basis weight of coating as web or line speeds change. Thus, the speed of the metering gear pumps can be keyed to the line speed of the conveyor to maintain predetermined accurate basis weight as the conveyor (web) speed changes.

Figure 7A:
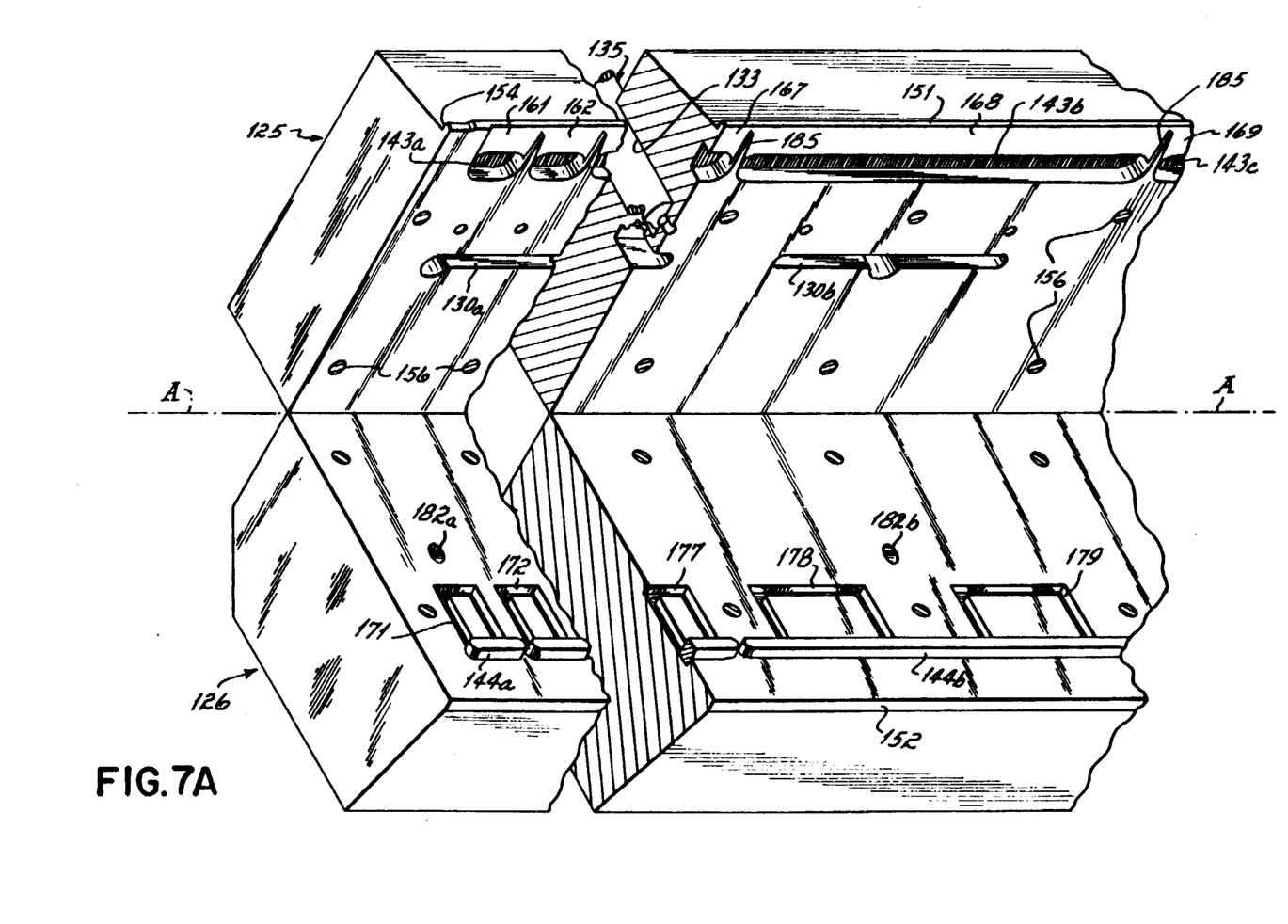
FIG. 7A is an isometric development drawing illustrating the inside faces of the die parts of the die of FIG. 7, showing the die faces with the parts opened for illustration about the axis All of FIG. 7.
Figure 7B:
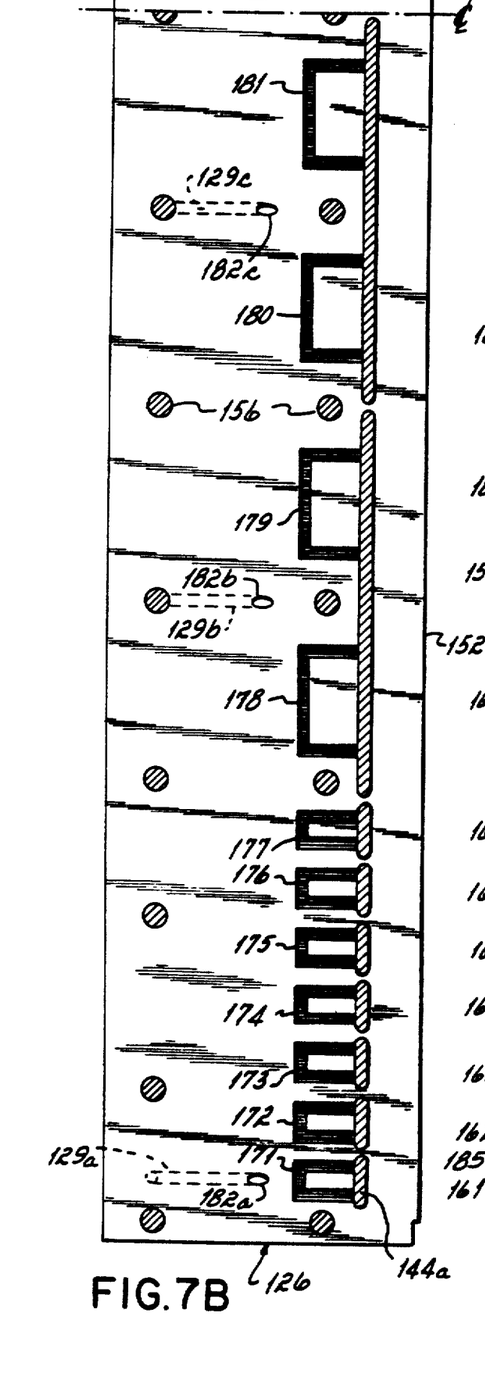
FIG. 7B is a cut view of the face of the lower die part of FIG. 7 taken along lines 7B—7B of FIG. 7.
Figure 7C:
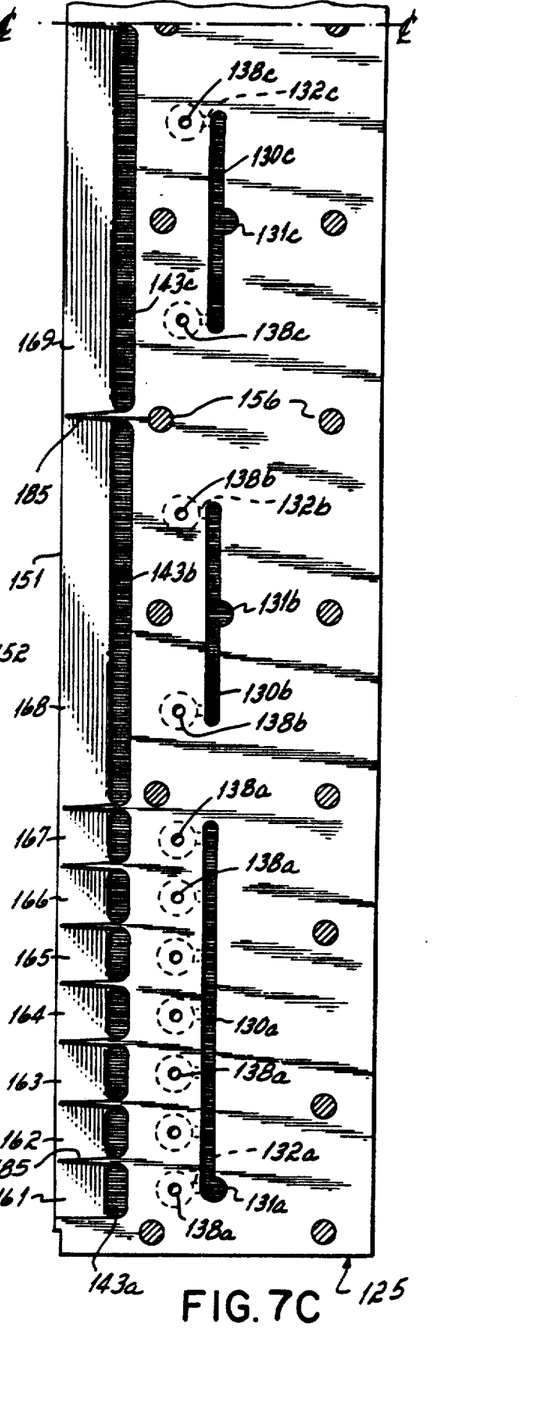
FIG. 7C is a cut view of the face of the upper die part of FIG. 7 taken along lines 7C—7C of FIG. 7.

Turning now to FIGS. 7 through 7C, details of a coating head, such as a coating head 22 or 58, will be described. It will be appreciated that FIG. 7 is essentially an end view of a coating head, with portions thereof broken away to show various features of the upper and lower die halves or portions 125 and 126, respectively. The details of the heads are best seen in FIGS. 7A through 7C, however, a general explanation is best obtained by reference to FIG. 7.

In FIG. 7, it will be seen that the upper die half 125 and lower die half 126, abut along essentially flat planar faces, except as further described herein. The die halves cooperate with each other for the transfer of adhesive from an inlet hose fitting 128, which is interconnected with a respective hose or supply line from a pump P. The pump P, of course, corresponds to one of the pumps 61 through 68, shown in FIG. 8.

Adhesive travels through bore 129 in lower die half 126 and is introduced through port 182 to an adhesive supply slot 130 in the upper die half 125. An enlarged cylindrical area 131 is provided at the interface of adhesive bore 129 and adhesive or glue supply slot 130, such as at 131. Ports such as port 132 extend between the adhesive supply slots 130 and the bore 133, housing a lower portion 134 of a valve module 135. One such valve module is associated with each "C"-shaped distribution channel (such as 115, 116, 117 in FIG. 8). Valve module 135 contains a valve stem 136, operable with a valve seat 137, to open and close a bore 138. As shown, adhesive can move through the port 132 into the port 139 of a seat member 137, and into the chamber 140. From chamber 140, adhesive, when the valve stem 136 is open, can make its way into port or bore 138. From bore 138, adhesive again traverses across the interface between the upper and lower die halves 125, 126, into a "C"-shaped distribution channel, such as at 142 (corresponding to similar channels 115–117, FIG. 8), only one leg of which is shown in FIG. 7.

As the adhesive moves down the legs of the "C"-shaped distribution channel 142, it enters a distributor or distribution bar channel 143, which is partially filled up by a preselected distributor bar 144 for providing a predetermined back pressure in the adhesive distribution system. The distributor bar 144 is actually mounted on a key 145, disposed in a slot 146, milled in the lower die part 126.

The relationship of the distributor bar 144 to the distribution channel 143 is significant. In particular, in order to provide uniform, even flow through a die slot, there must be sufficient back pressure built up in the die or land areas, together with sufficient spreading and distribution to provide even flow across the die or land. In this case, each land in the die is served by a respective single distribution bar 144 in a respective distribution channel 143. The channel 143 has three segments, 143A, 143B and 143C (FIG. 7). Segment 143A is oriented to extend perpendicularly from lower ends of the legs of the "C"-shaped distribution channels 143 with which it mates. Segment 143B extends perpendicularly from segment 143A to segment 143C, which is parallel to segment 143A. The single channel 143 is thus divided by bar 144 into three segments.

As depicted in FIG. 7, segment 143A is of greater width than segment 143B, while segment 143B is of greater width than segment 143C. The separate legs of the respective "C"-shaped channels 142 thus mate with relatively large spreading chambers (segment 143A) over the distribution bars 144, permitting easy distribution along the length of the bar, and thus over the width of the associated land, as will be discussed. The channel 143 then narrows, in segment 143B, and again narrows in segment 143C prior to introduction to the respective land areas 150. This successive reduction in the cross-sectional area or flow capacity of channel 143 permits good back pressure as is desirable, without inhibiting the lengthwise distribution of adhesive along the distributor bar 144.

Thus, the invention provides very clean, smooth adhesive passages over very short traverse distances in the respective die parts, providing necessary back pressure, uniform distribution and easy cleaning when the die head is split along the part line. The die facing surfaces are perfectly flat, with no difficult, complimentary curves to machine, no corners to capture residue or to harbor air voids, and no extensive internal die passages.

From the distributor bar channel, the adhesive is widely dispersed across the land area, such as at 150 (FIG. 7). The land area 150 is defined between the bottom die half 126 and a recessed land area milled in the face of the upper die half 125. The upper die portion 125 includes a die lip 151, while the lower die portion 126 defines a die lip 152, defining between them a fine slot die outlet 153 (see 121 in FIG. 8), which extends across the face of the die or coating head 22 (58—FIG. 8). Such die slot is elongated end-to-end across the coating head, for example 72 to 80 inches long, and may be, for example, 0.010 inches wide. While not readily visible from FIG. 7, it will be appreciated that the recessed land or nozzle areas 150 (i.e. 161–169) terminate short of the outer edge of the lips 151, 152. This is more clearly seen with reference to FIG. 7C.

It will be appreciated that selected valve modules 135 can be pneumatically operated to open and shut the respective valve stems 136 to selectively discontinue the introduction of adhesive into the associated "C"-shaped distribution channel, such as 142. It will also be appreciated that the coating head 22 (58—FIG. 8) can be heated, such as by a heater shown only diagrammatically at 155, and which may include a cartridge heater extending into the lower die portion 126. It will also be appreciated that screws 156 can be utilized to join the upper die portion 125 with the lower die portion 126, through holes in each die half.

Turning now to FIGS. 7A through 7C, it will be appreciated that FIG. 7A is an isometric depiction of the inner face of a representative upper die half 125 rotated away from the inner face of a representative lower die half 126 about an axis A, as shown on both FIGS. 7 and 7A. This development is for clarity only, as the die halves do not normally move in this manner.

With reference to FIG. 7A, it will be appreciated that FIG. 7A is broken, and shows outermost nozzles or land areas 161, 162. The Figure then picks up with an inner nozzle or land area 167, continues with a nozzle or land area 168, and then is broken just at nozzle or land area 169, such as may correspond to land 112 in FIG. 8. FIGS. 7B and 7C are taken along the cut lines 7B–7C of FIG. 7 and are representative of a coating head having wide internal lands and an outer segment having seven individual lands thereon. These seven lands extend preferably over a distance of about 8 to 10 inches, for example, but can be wider or narrower as required for a given application. FIGS. 7B and 7C are not broken as in FIG. 7A, and show a configuration of a face of a lower die portion 126, for example, in FIG. 7B, and the face of an upper die portion 125, such as shown, for example, in FIG. 7C. In FIGS. 7B and 7C, only one half of each die face is shown, the other half being symmetrical on the other side of the center line C/L.

In this configuration, one half length of the die faces as shown include two interior segments of relatively wide single lands and a single outer segment of seven narrower lands. This further illustrates that the selection of the particular number of nozzles and their orientation is arbitrary.

Accordingly, and in FIG. 7C, an outer segment is shown comprised of lands 161 through 167, while two adjacent inner lands 168 and 169 are also depicted. Of course, in FIG. 7C, only the recessed land areas so numbered are shown, the entire land area or nozzles being formed by these land areas, separations between them as will be described, and the opposite die half or portion, once the die halves are assembled.

As shown in FIG. 7B, the lower die portion 126 has seven "C"-shaped adhesive distribution channels 171 through 177, utilized in connection with the outer segment. The next innermost segment is provided with two "C"-shaped adhesive distribution slots or channels 178 and 179. The next innermost segment has "C"-shaped distribution channels 180, 181. Also in the lower die slot are respective adhesive supply bores 129a, 129b and 129c, terminating in ports 182a, 182b and 182c, corresponding to the port 182, shown in FIG. 7. An adhesive slot 130a is located in the upper die half 125, FIG. 7C, which die half also includes an adhesive slot 130b and 130c, corresponding to the slot 130, for example, shown in FIG. 7. The adhesive slot 130a has a plurality of bores 132a, interconnecting the slot 130a with respective bores 138a. Slot 130b is interconnected with bores 132b, which communicate with ports 138b. Supply slot 130c communicates with ports 132c, which communicate with bores 138c. Ports 138a, 138b, and 138c correspond with bores 138 of FIG. 7.

Continuing with the description of FIG. 7C, the adhesive supply slot 130a has an enlarged cylindrical portion 131a, while slot 130b has an enlarged cylindrical portion 131b, and slot 130c has an enlarged cylindrical portion 131c. Each of these correspond with the enlarged cylindrical portion 131, such as that shown in FIG. 7.

It will thus be appreciated that each segment of the die head is provided with a glue supply slot 130 and the enlarged cylindrical portions 131 interface with the ports 182 of the adhesive supply bores 129 in the opposite lower die portion 126, as shown in FIG. 7B, when the faces of the die halves are brought together.

It will also be appreciated that when the faces of the die halves are brought together, the respective bores 138 each adjoin the cross-over or bight portion of a respective "C"-shaped distribution channel. Looking at FIGS. 7B and 7C, the distribution channel 171 is served by the bore 138a, which is the bottommost bore in FIG. 7C. The "C"-shaped distribution channel 172 is served by the next bottom most bore 138a in FIG. 7C, and so on.

It will also be appreciated that a distribution bar 144a, as shown in FIG. 7B, is mounted on the lower die portion 126, just beneath the legs of the "C"-shaped distribution channels. One of these distribution bars is so mounted with respect to each distribution channel, longer distributor bars being mounted across the segments corresponding to the nozzles or land areas 168 and 169 in FIG. 7C. These fit within the distributor bar channels 143, such as that shown at 143a at the bottom of FIG. 7C, when the die halves are brought together. It will also be appreciated that the lowermost portion of the legs of the "C"-shaped distribution channels, such as at 171, intersect, when the die halves are brought together, with a respective distributor bar channel such as 143a, so that adhesive in the distribution channels 171 through 181 can flow into the respective distributor bar channels, which are associated with the nozzle or land areas 161 through 169, as shown in FIG. 7C.

Referring momentarily to FIGS. 7A and 7C, it will be appreciated that each of the nozzle or land areas, such as at 161, 162 for example, are separated by an integral, sliver-like projection of the upper die half 126. These portions are illustrated, for example, at 185 and are tapered. It will also be appreciated from the figures that each of the projections 185 terminates short of the die lip 151 and when the two die portions 125, 126 are merged together, short of the die lip 152 and outlet 153.

It will also be appreciated that when the respective bores 138 are closed by the die stem such as 136, the respective, communicating "C"-shaped distribution channel is cut off from adhesive pressure and no adhesive will flow through the associated nozzle or land area 150.

Accordingly and in use, adhesive is supplied from an extruder to the pump such as a pump P, as shown in FIG. 8. These pumps are interconnected in a predetermined manner, as shown in FIG. 8, according to the number of segments and the number of lands within the segments as may be needed for any particular width coating area. When adhesive is supplied to the pumps, it flows through the hoses 81 through 88, for example, into supply bores 129 (FIG. 7). These feed the respective adhesive supply slots 130, each of which is interconnected with one or more "C"-shaped distribution channels (142 FIG. 7) through individual valves, so that adhesive flow through each of the respective distribution channels can be independently and selectively controlled. The adhesive flows from channels 142 into the distributor bar channels 143 and into the land areas, such as at 150 (corresponding to any of the other numbered land areas of the figures). On emerging from the lands, the adhesive knits or intermingles with adhesive flow from adjacent land areas to form a uniform, fibrous pattern of glue emanating from the outlet 153 and onto a substrate, which preferably contacts the coating head at the outlet 153 and the lips 151, 152, to provide adhesive matrix coating as described above.

As noted above, the motors are controlled by any suitable control means as will be appreciated, so that their speed may be adjusted, in order to ensure that a uniform flow of adhesive can be provided through each of the land areas to produce a uniform adhesive pattern emanating from the coating head whether or not adhesive flows across other lands fed from pumps driven by the same motor.

Of course, any suitable form of extruder 44 or other hot melt delivery system can be utilized to supply the metering stations, which are comprised of the pumps and motor drives. One such extruder for example, is extruder model XP20, available from Nordson Corporation of Westlake, Ohio.

Accordingly, by these means, various width adhesive coatings can be applied to porous materials, all to provide porous, breathable fabric laminates. The coating widths can be easily changed without modification or disassembly of the coating dies. Very lightweight coatings, for example 1.5 grams per square meter, can be suitably produced, as well as porous adhesive coatings of up to 28 grams per square meter of contact area, for example, it will also be appreciated that the coating heads or the webbed feeding apparatus may be shifted laterally, as viewed in FIG. 8, in order to shift the position of the respective adhesive coating on the underlying substrate, should that be desired.

Accordingly, flexible breathable laminates are provided with good hand and flexibility, which are not unduly sensitive to heating processes such as in ironing, and in very wide widths without variation in uniformity of the adhesive.

It should also be appreciated that the invention contemplates the provision of a flexible, breathable fabric or textile having a non-slip surface on one side. As depicted in FIG. 1, a first web 10 may comprise a breathable fabric with an adhesive matrix 11 thereon. When the adhesive is cured, the result is a first web having a cured adhesive matrix. The adhesive resides on one side of the web so that portions engage an underlying surface, on which the web is laid, and serve as a non-skid face. The web thus constitutes a breathable fabric component having a non-skid surface without loss of hand, flexibility, breathability or off-side appearance.

Moreover, the invention also contemplates a single layer or ply fabric with an adhesive matrix thereon, which matrix locks the fibers or threads of the fabric into place and prevents their dislodgment, without affecting fabric hand, flexibility, breathability or appearance.

These and other modifications will become readily apparent to those of ordinary skill in the art, without departing from the scope of the invention, and the applicants intend to be bound only by the claims appended hereto.

We claim:

1. Apparatus for producing an integral adhesive matrix from adhesive material supplied under pressure to the apparatus, said apparatus comprising:
    a die including an elongated die outlet extending across said die;
    at least one land area in said die adjacent said die outlet;
    at least one elongated adhesive distribution channel in said die operatively associated with said land area for receiving adhesive under pressure from supply and for distributing adhesive to said land area;
    an adhesive distribution bar means disposed in said distribution channel for dividing said distribution channel into a plurality of successive adhesive channels of progressively decreased cross-sectional adhesive flow areas for distributing adhesive uniformly across said land area to form said integral adhesive matrix.

2. Apparatus as in claim 1 including a plurality of separate land areas in said die, each separated from the other, a separate distribution channel operatively connected to a respective land area, and a separate said distribution bar means disposed in each separate distribution channel for defining decreasing cross-sectional adhesive flow areas in said distribution channels.

3. Apparatus as in claim 2, wherein apparatus includes selectively controllable metering means for supplying adhesive to each distribution channel to produce a uniform adhesive matrix independent of the number of land areas through which adhesive flows to said die outlet.

4. Apparatus as in claim 1 wherein said elongated adhesive distribution channel is an elongated channel having internal walls; and
    wherein said distribution bar means comprises an elongated bar having external surfaces and being disposed in said elongated channel, said bar surfaces defining with said channel walls said plurality of successive adhesive channels.

5. Apparatus as in claim 4 wherein said elongated channel is rectangular in cross-section having a first, second and third walls, and wherein said elongated bar has first, second and third surfaces disposed respectively spaced from and opposite said first, second and third walls for defining said plurality of successive adhesive channels of progressively decreased cross-sectional adhesive flow areas.

* * * * *